Dec. 16, 1958   F. R. BALCAR ET AL   2,864,757
OZONE CONCENTRATION AND DILUTION
Filed Feb. 17, 1956   3 Sheets-Sheet 1

INVENTORS
FREDERICK R. BALCAR
WOLCOTT DENNIS
BY H. Hume Mathews
Robert W. Ely
ATTORNEYS

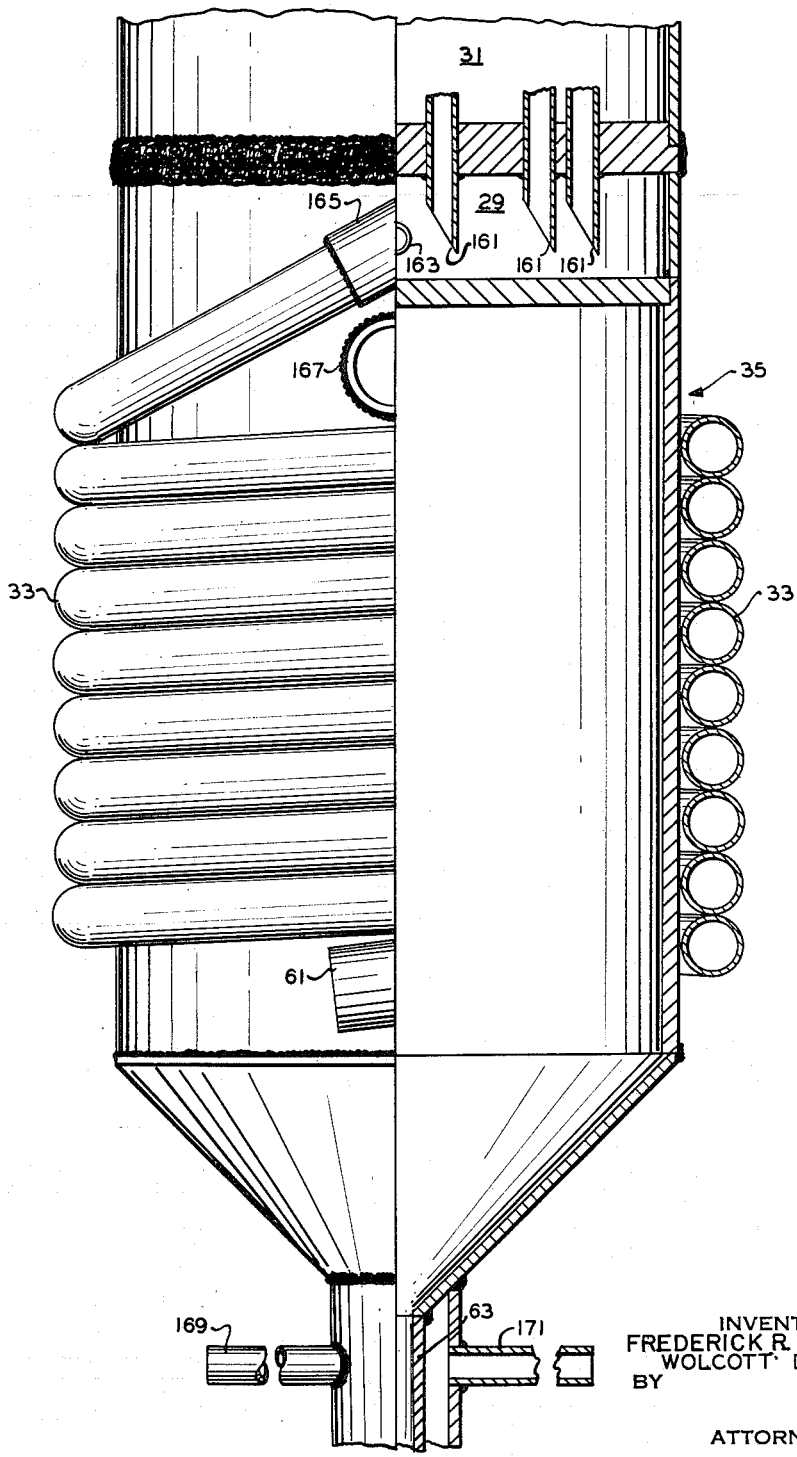

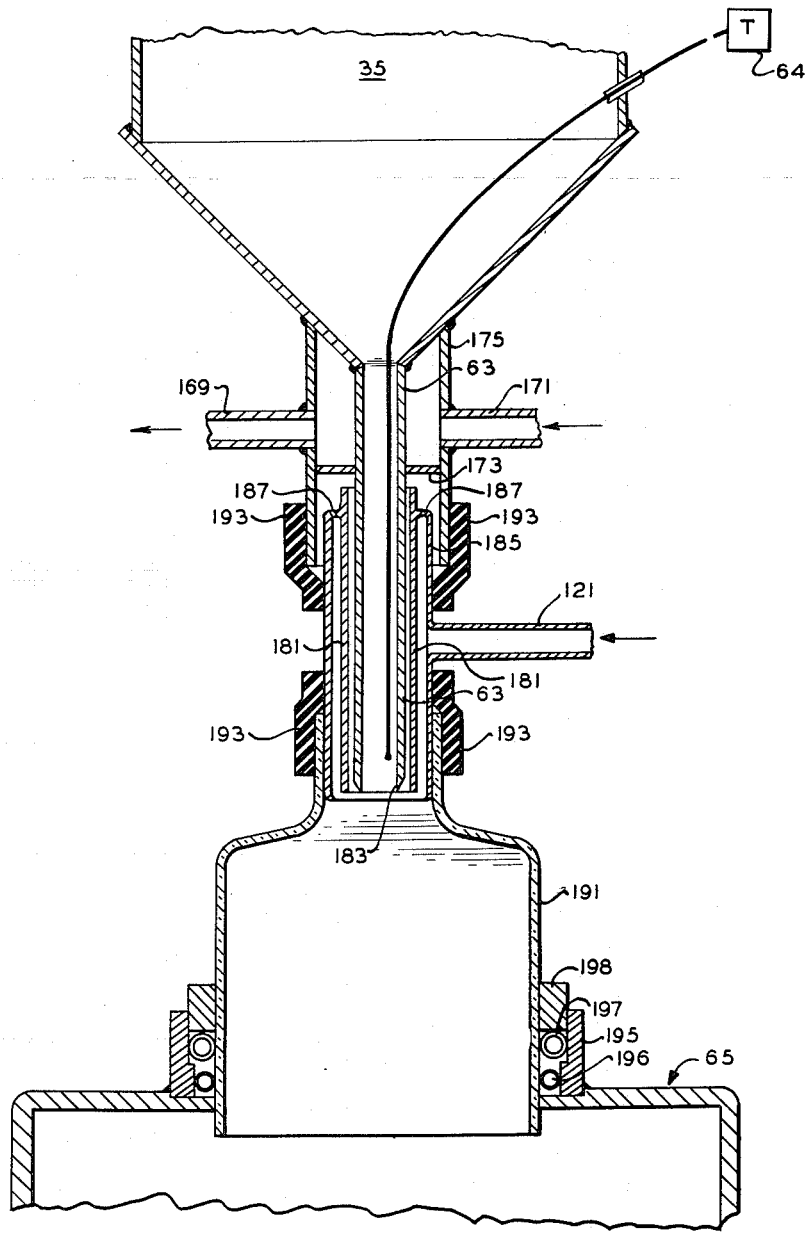

United States Patent Office 2,864,757

Patented Dec. 16, 1958

2,864,757

OZONE CONCENTRATION AND DILUTION

Frederick R. Balcar, Stamford, Conn., and Wolcott Dennis, Basking Ridge, N. J., assignors to Air Reduction Company, Incorporated, New York, N. Y., a corporation of New York Application February 17, 1956, Serial No. 566,236

10 Claims. (Cl. 204—176)

The present invention relates to ozone and the use of ozone in chemical reactions and more particularly concerns a method and means for obtaining a desired concentration of ozone in a carrier gas which is to be used in a chemical reaction or the like.

The great advantages in using ozone in chemical reactions have long been known. For chemical reactions it is often preferred to ozonize oxygen because the same apparatus which produces ozone would also tend to change nitrogen into undesirable compounds if air is passed through the ozonator. Furthermore, in many cases the nitrogen of the air would be undesirable for the chemical reaction. If oxygen is used as the gas to be ozonized, it has often been necessary to waste a large part of the oxygen which is not converted to ozone. This occurs because after the ozone in the oxygen has been utilized in the chemical reaction, the oxygen contains contaminates ($H_2O$ or hydrocarbons harmful to the ozonator or hazardous). The carrier oxygen must be vented to the atmosphere, since it cannot usually be returned to the ozonator where the contaminates could cause the ozone to explode or produce undesirable products at the time of ozonizing. Furthermore, most ozonators operate at peak efficiency when they produce a predetermined percentage of ozone. Some ozonators produce efficiently only at a very high percentage of ozone which probably could not be used safely or economically in a chemical reaction. From the foregoing, therefore, it is apparent that there is a need for economically providing a predetermined concentration of ozone in an inexpensive carrier gas or inert carrier gas and for providing means for taking a given concentration of ozone and safely obtaining such a concentration.

It is a primary object of the present invention to provide means for safely evaporating concentrated ozone and entraining it in a carrier gas.

An additional object is the provision of means for separating and concentrating ozone from oxygen and safely transferring it to a vaporizing liquid, and for producing a predetermined but variable concentration of ozone in a carrier gas from a concentration of ozone.

An additional object is the provision of means for vaporizing concentrated ozone, picking it up in a carrier gas and efficiently using it in the chemical reaction without passage through the ozonator.

The accomplishment of the foregoing objects, along with the features and advantages of the present invention, will be apparent from the following description and the accompanying drawing in which:

Figure 2 is a semi-cross-sectional view of the means for separating concentrated liquefied ozone-oxygen and for directing it toward the suitable vaporizing fluid; and Figure 3 is a cross-sectional view of the discharge area for concentrated ozone and includes the lower portion of the device shown in Figure 2.

Figure 1:
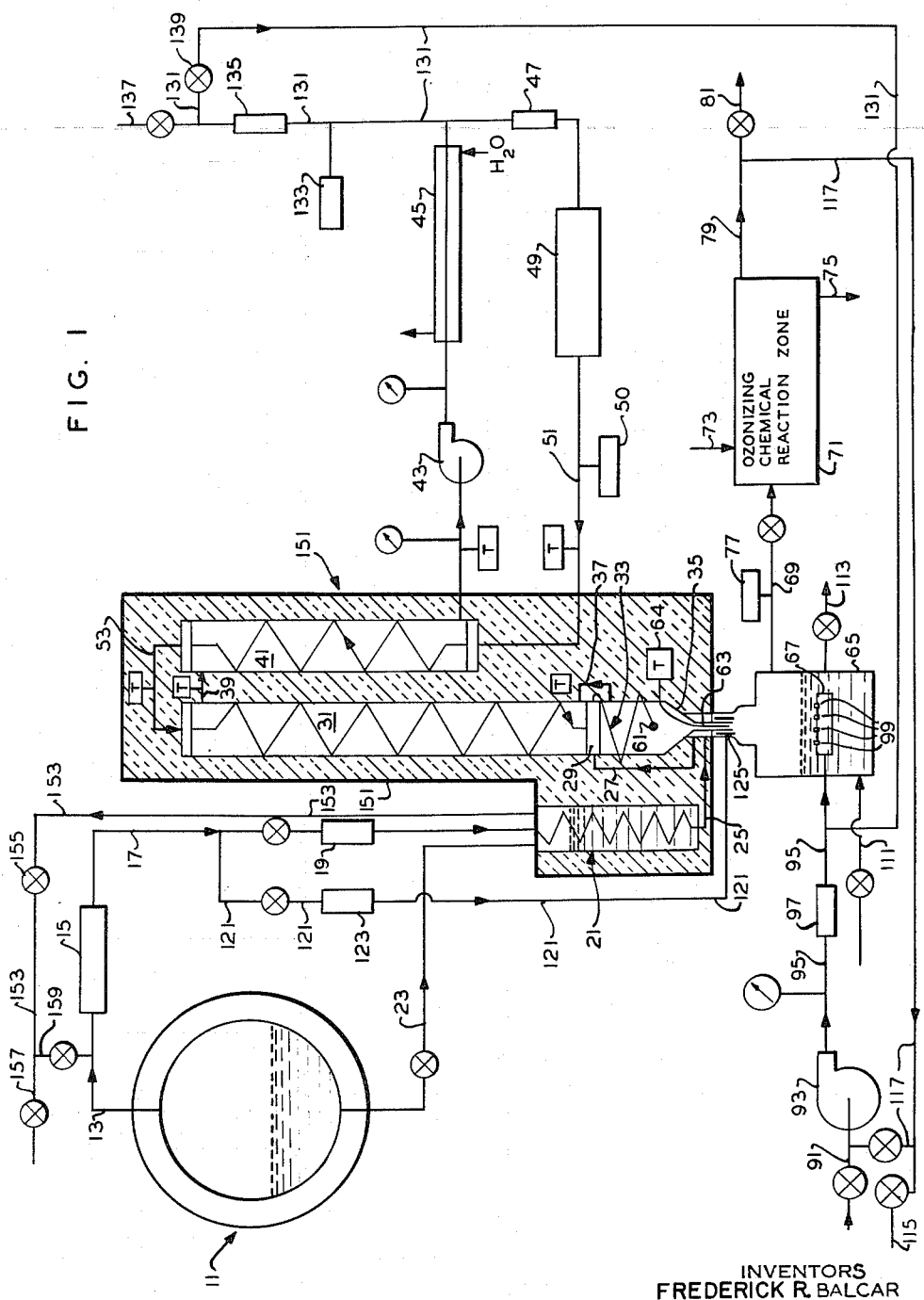
Figure 1 is a schematic representation of the entire process and apparatus and shows at the center thereof means for obtaining concentrated ozone and for dropping it into a suitable fluid for vaporization into a carrier gas.

According to the preferred embodiment of the present invention, oxygen gas from a suitable storage container is purified in a particular manner and is refrigerated by heat exchange with liquid oxygen from the same container. This liquid oxygen is warmed by direct and indirect heat exchange with an ozone-containing oxygen whereby the ozone-containing stream is liquefied. The thus-warmed gaseous oxygen, along with re-circulated oxygen, is then sent to an ozonator wherein a portion of the oxygen is converted to ozone. This ozone-containing oxygen is then, as above-mentioned, liquefied by heat exchange with the incoming oxygen and then cooled to substantially saturation temperature by mixing with liquid oxygen. The ozone liquid is continuously removed as formed from the liquefaction step, is separated from oxygen which mostly evaporated, and is dripped into water for vaporization of residue liquid (40–80% ozone). The vaporizing ozone is picked up preferably by a stream of air at ambient temperature which flows through the water. The ozone vaporizes on contact with water and is conveyed to appropriate equipment for use of the ozone content. In some instances, it is preferred that inert gas be used in place of air, where nitrogen cannot be tolerated and, when the ozone-using process does not contaminate the inert gas, the inert gas is preferably re-cycled to the water which vaporizes the ozone. The flow rate of the air or inert gas can be varied independently of the separation and ozonizing process to produce various concentrations of ozone. The ozone product of the liquefaction step preferably is a liquid having 40–80% ozone concentration. Any excess of oxygen gas preferably is drawn off by a blower connected just upstream of the ozonator. This oxygen can be used elsewhere or sent to storage. It is also preferred that certain apparatus features be utilized since, in spite of the adequate removal of atmospheric or other impurities, it is believed that there is danger in ozone-containing liquid contacting warm surfaces in the apparatus. Thus, one such apparatus feature is the provision of a concentric low velocity jet of oxygen around the ozone drip tube exit. This prevents contact of the ozone liquid with any warm part of the apparatus before reaching water in the vaporizer and also avoids icing of the tube. An additional preferred feature is means for providing ventilation of the concentric pair of tubes used to form the foregoing described jet.

In Figure 1 of the drawing a suitable conventional liquid oxygen storage container is designated by reference numeral 11. This insulated tank is adapted to maintain liquid oxygen at about 15 p. s. i. g. It is to be understood, however, that pressures of the order of 100–200 p. s. i. g. can be used to provide for flow through the system. Gaseous oxygen from the vapor space of tank 11 is passed by means of pipe 13 to catalytic furnace 15 wherein substantially all traces of hydrocarbon are removed. This step of purification is preferably made so as to achieve the result described in the Thorp et al. United States Patent No. 2,700,648. The furnace preferably is maintained at about 800° F. and contains De Oxo "F" catalyst which is the trade name for a commercially-available catalyst comprised of palladium on alumina and sold by Baker and Company of Newark, New Jersey. Silver on alumina has also proved satisfactory oxidizing catalyst, although a temperature of about 1300° F. is required.

In furnace 15, carbon-containing contaminates are oxidized until such contaminates (expressed as carbon dioxide) have been reduced to not more than approximately 20 parts per million by weight, whereby a highly purified oxygen gas is obtained. It is, of course, desirable that this high degree of purity be maintained in the ozone system. In other words, since highly-concentrated ozone-containing material is to be produced, the remaining parts of the apparatus where such a concentration might exist or collect must be maintained with a contaminate concentration of less than what has just been described for maximum safety.

From combustion furnace 15, the highly purified oxygen flows through pipe 17 through rotameter 19 to the interior passage of heat exchanger 21. The space surrounding the interior passage heat exchanger 21 contains liquid oxygen which flows through pipe 23 from tank 11. In passing through the interior passage of heat exchanger 21 the gaseous oxygen is cooled and liquefied and then passes through pipe 25 to an annular space surrounding the top of a drip tube. Thereafter, this highly purified oxygen flows in pipe 27 to mid-chamber 29 below the first section of the ozone-oxygen heat exchanger 31. In mid-chamber 29, the oxygen mixes with incoming ozone-rich fluid and then the combined stream flows through heat exchanger coil 33 on the lower part of separator 35. After separation, the incoming oxygen and recirculated oxygen flows through pipe 37 and then the exterior passage of the first heat exchanger 31 and so cools the ozone-containing oxygen moving in the interior passages of heat exchanger 31. From heat exchanger 31, the oxygen flows through conduit 39 to the second heat exchanger 41. In heat exchanger 41 the oxygen cools ozone-containing oxygen from the ozonator which is flowing in the coils of heat exchanger 41. The incoming oxygen leaving heat exchanger 41 moves through blower 43 to water-cooled cooler 45 wherein it is further cooled. This incoming oxygen then flows through rotameter 47 and then to ozonator 49. This ozonator 49 is a conventional Welsbach ozonator (type C–34) which converts oxygen to ozone by electrical discharge.

The type "C" Welsbach ozonator which was used for the present invention was a tubular type unit, each tube therein consisting of a group of individual tubes with a common manifold. Outer electrodes are stainless steel tubes fastened into tube sheets and surrounded by water which serves as a cooling medium. Sliding telescopically into these stainless steel tubes are tubes of boro-silicate glass, the inner surface of which is coated with a conductive film which serves as the other (inner) electrode, the glass acting as a dielectric. Oxygen enters at one end of each ozonator in a plenum chamber which serves as a common manifold. The oxygen passes through the discharge space between the glass and the stainless steel, where oxygen was converted into ozone. The voltage applied to the ozonator is about 15,000 volts at 60 cycles. The C–34 ozonator has 34 tubes. This ozonator is rated at 20 lbs. of ozone in oxygen per day at about 2.0% by weight. Such an ozonator is described in the Kirk Orthmer Encyclopedia of Chemical Technology (1951) at page 746 of volume 9. It is to be understood that other types of ozonators can be used, such as described on pp. 741–747 of the above-identified encyclopedia.

From ozonator 49, the ozone-containing oxygen stream flows through pipe 51 to the interior coils of heat exchangers 41 and 31 which are connected by pipe 53. It is to be understood that the interior coils, while shown as single coils, consist of a multiplicity of coils suitably constructed and arranged to provide adequate heat transfer.

In heat exchangers 41 and 31, the ozone-containing oxygen is cooled and liquefied. It discharges from the bottom of the coil in heat exchanger 31 into mid-chamber 29 where it joins the incoming liquid oxygen from pipe 27. The mixture of incoming liquid oxygen and the liquefied ozone-containing oxygen pass out of mid-chamber 29 through coil 33 and eventually discharge into separator 35 through port 61. In heat exchange coil 33 a variable amount of liquid oxygen is vaporized. In separator 35 the liquid ozone, preferably with some liquid oxygen, is separated from oxygen vapors and drains through drain tube 63 into vaporizer 65. In vaporizer 65 the liquid ozone concentrate is vaporized by contact with the relatively much warmer water and is picked up by the air discharged through manifold 67. The air stream carrying the vaporized ozone moves from separator 65 through valved pipe 69 to an ozonizing chemical reaction schematically represented by a block which is numbered 71. Conduit 73 feeds the raw material to the chemical reaction while conduit 75 removes the reaction product. An ozone analyzer 77 connects into pipe 69.

After the ozone has been utilized in the chemical reaction, a residual air stream leaves through pipe 79 and is discharged to the atmosphere through vent 81. In some cases it may be desirable to provide a catalytic combustion furnace (not shown) for converting residual traces of ozone in atmospheric vent 81. The air which is used to pick up the vaporized ozone in vaporizer 65 enters the process through valved pipe 91 and flows through blower 93. The air next flows through pipe 95, having a rotameter 97 therein, to the above-mentioned air manifold 67 schematically shown as having four discharge ports 99. This air can be purified, as above described, if desired. It is to be noted that the water for vaporizing the ozone enters through valve 111 and leaves the vaporizer tank 65 by valve pipe 113. In some instances, this water could be water which requires the beneficial treatment resulting from contact with ozone and hence it is possible to obtain purified water by this arrangement.

It is to be understood that by means of valved pipe 115 inert gas such as argon or helium or other suitable non-reactive gas can be used for picking up the vaporized ozone in tank 65. For this type of operation, valved pipes 91 and 81 would be closed off and the carrier gas other than air would be admitted via valve pipe 115 with valved by-pass pipe 117 being open. Open valved pipe 117 provides a passage from the downstream of the chemical reaction zone to upstream of the blower 93.

The chemical reactions which can be performed at 71 are described on pp. 751–753 of the above-identified encyclopedia. For example, ozonolysis reactions can be effected to make anisaldehyde from anethole and in preparation of cortisone or ozone can be used in the bleaching of cotton.

Referring back to the incoming oxygen conduit 17 connected to tank 11, it can be seen that a valved pipe 121 branches off from pipe 17, flows through a rotameter 123, and continues to a concentric jet device 125 which surrounds the drip tube 63. This device 125 is shown schematically in Figure 1 and will be explained in greater detail with reference to Figure 3. Generally speaking, jet device 125 provides the above-mentioned apparatus feature which prevents contact of the ozone liquid with any warm part of the apparatus before reaching the water in vaporizer 65 and also avoids icing of the drip tube.

With reference to the right-hand side of Figure 1, it can be seen that a branch conduit 131 connects into the pipe extending between cooler 45 and rotameter 47. Branch pipe 131 has an ozone analyzer 133 connected thereto and downstream thereof there is a rotameter 135, a valved outlet pipe 137 and a valve 139, in pipe 131. Pipe 131 leads to pipe 95 which carries air to the manifold 99 and vaporizer 65. By means of this pipe 131, it is possible to vary the pressure in vaporizer 65, so that the passage of vapor from separator 35 into the vaporizer 65 can be suitably halted or retarded, depending upon the concentration of oxygen concentration in the carrier air, leaving vaporizer 65. It is also apparent that any flow of gas due to a pressure increase upwardly through drip tube 63 will retard the flow of liquid ozone concentrate through the drip tube 63.

With reference to heat exchanger 21 at the left of the insulated casing 151, it is to be noted that the oxygen gas outlet pipe is provided and is designated 153. This pipe has a valve 155 and leads to valved branch pipe 157 which can be suitably connected to oxygen storage means, such as a conventional gas holder or compressor and storage banks of long, high-pressure oxygen cylinders. Of course, if it is possible, this oxygen gas could be immediately warmed and immediately used in some chemical reaction or oxy-acetylenic welding or oxygen cutting. Valved pipe 159 connects through a T joint between pipe 157 and pipe 153 and leads to the gaseous oxygen inlet pipe 13. By means of valved pipe 159, it is possible to use some of the gaseous oxygen produced in heat exchanger 21 in the system. This may occur, for example, when the vapor supply in tank 11 is depleted.

In Figure 2, it can be seen that separator 35 has a helically-wound heat exchange coil 33 on the outside thereof. Mid-chamber 29 has three inlet tubes, extending therein which constitute the discharge means for the three coils within heat exchanger 31. It is to be noted that the outlets 161 of these coils have the appearance of hypodermic needles and terminate below the inlet 163 which is connected to pipe 27 of Figure 1. This inlet is about ½ way up in chamber 29. It is apparent that the liquid ozone-containing oxygen discharging from outlets 161 contacts liquid oxygen entering inlet 163 at the lower tip of outlets 161 and does not drop into liquid oxygen in mid-chamber 29. The entrance 165 to coil 33 is partially broken away and serves to pick up a mixture of liquid ozone-containing oxygen and incoming liquid oxygen for passage through coil 33. In coil 33 the oxygen is mostly vaporized and the resulting gas-liquid stream is discharged into separator 35, through inlet 61, which was referred to in Figure 1. It is to be noted that the gas outlet 167 of separator 35 is located just below the plate forming the bottom of mid-chamber 29. This outlet connects to pipe 137 mentioned with reference to Figure 1. The conical bottom wall of separator 35 is connected to drip tube 63. The thermal-couple 64 having its bulb extending to adjacent the bottom of the drip tube 63 is not shown in Figure 2. The outlet connection 169 to the annular chamber around the top of drip tube 63 connects to pipe 27 referred to in Figure 1. The inlet connection 171 to the foregoing mentioned annular chamber connects to pipe 25 referred to in Figure 1.

In Figure 3, the capillary tube and bulb of thermal-couple 64 is shown extending through the bottom part of cylinder wall of separator 35 and terminating adjacent the lower pointed edge of drip tube 63. The bottom wall 173 forms, together with the upper part of tube 175, the annular space around the top of drip tube 63 as shown attached to the drip tube 63. Surrounding the lower part of drip tube, there is an adjacent concentric tube 181 which provides an annular passage down along the drip tube to its pointed bottom edge 183. Integral with concentric wall 181 is another surrounding concentric wall 185. Wall 185 is joined to inner concentric wall 181 adjacent the top of wall 181. It is to be noted that this horizontally-extending junction portion of wall 185 has a plurality of ports 187 therein for the passage of oxygen from pipe 121 referred to in Figure 1. Thus, the oxygen will escape from the annular chamber formed by walls 185 and 181 and flow up over the top edge of wall 181 and down along the drip tube 63 for discharge as an annular flow into the space enclosed by sight glass 191 toward the vaporizing H₂O. It is to be noted that suitable reducing couplings 193 join sight glass 191 to wall 185 and join the bottom of tube 175 to wall 185. The vaporizer is suitably associated with the sight glass 191 by means of an upstanding annular bracket 195 and two annular gaskets 196 and 197, which are pressed, the upper 197 and larger of which, is pressed downwardly by an annular ring 198. As above suggested, it is to be understood that any metallic items incorporated in the apparatus which come into contact with ozone are made from chloroprene or other suitable inert synthetic rubbers or materials.

The described apparatus was sized to match the above described ozonator. The exchanger was designed to provide a mean temperature difference of about 20° F., and was designed in two sections, a "cold" section and a warmer section. The cold section was designed so that the ozone dew point would occur about half way through the section.

The operating of the apparatus and method of the present invention is believed to be obvious to those skilled in the art from the above description. It is to be noted, however, that incoming liquid oxygen is used as make up and refrigeration and is introduced into space 29. Together with the cycle gas and ozone, it passes out of the space through the coil 33 to the separator. Vapor from the separator returns through the shell side of the exchanger system to the cycle blower and ozonator. Liquid separated in the separator drips through a small tube at the bottom thereof to the water in the water tank which was connected to the separator by a sight glass so the dripping liquid could be observed.

The ozone dripping into the water vaporizes substantially on contact. Air introduced through the manifold below the surface of the water picks up the vaporized ozone.

Analysis of ozone was obtained by measuring the temperature rise on decomposition over a catalyst. Thermocouples installed in the system provided means for measuring heat transfer efficiency, one thermo-couple located in the separator drain serving to approximate the ozone concentration at this point since 50 percent ozone liquid is about 1° F., and 80 percent ozone liquid is about 3.5° F., warmer than 100 percent liquid oxygen.

Several explosions occurred in the sight glass surrounding the separator drip tube after relatively short runs (less than one hour). These were apparently due to liquid from the drip tube getting onto the warm glass and vaporizing. Explosions at this point were eliminated by providing the above-described concentric low velocity jet of oxygen around the drip tube exit to carry the ozone through the sight glass connection without contact. This arrangement also served to avoid collection of frost on the drain tube.

One explosion occurred in the dead end space above the concentric pair of tubes used to form the jet. This was apparently due to condensation of concentrated ozone in the cold region at the top of this space, the condensate then running onto a warm surface. Ventilation of this space by the very small oxygen stream above described resulted in freedom from explosions in all subsequent runs.

Table I gives a summary of certain typical flows and analyses, together with ozone balances for these runs. Table II gives pressures, temperatures, and temperature differentials. The numerals in the tables indicate the instrument or flow conduit at which the characteristic was measured.

In making the ozone balances of Table I, it was assumed that the flow from the vaporizer was the sum of liquid oxygen feed, plus oxygen gas to the concentric jet, plus air or oxygen into the ozone vaporizer through meter 97. Waste oxygen 135 was also piped to the vaporizer so that this flow was not actually removed from the system. Net ozone produced is the indicated cycle flow times the difference in ozone concentration leaving and entering the ozonator. In all but one case, the ozone balances, made as indicated above, show more ozone in the vaporizer outlet than was produced. This discrepancy could be accounted for by leakage at the blower packing or elsewhere which would reduce the flow from the vaporizer to a value below the sum of the feeds.

Concentration of ozone in the liquid from the separator was estimated from the separator liquid temperature as indicated by 64 and the temperature of liquid oxygen at separator pressure.

Approximately 10 ft. of ½" O. D.—.035" wall tubing was used in the coil leading the mixture of cycle gas and liquid oxygen to the separator to maintain liquidgas contact for heat transfer and result in a close approach to saturation temperature. The temperature approach was approximately 5° F. above liquid oxygen temperature. The analyses show that, at the temperature obtained, approximately 3% of the ozone remained in the vapor state and was returned to the ozonator.

Table I

| Run No. | 33 | 35 | 36 | 38 | 39 |
|---|---|---|---|---|---|
| Ozonator On, Hrs. | 3.0 | 4.0 | 3.0 | 3.5 | 3.5 |
| Flows—S. C. F. M.: | | | | | |
| Cycle Rate (47) | 10.35 | 10.7 | 10.9 | 10.6 | 10.9 |
| Waste O₂ (135) | .25 | .22 | .22 | .23 | .23 |
| Liq. O₂ to Exch. (19) | 2.29 | 1.93 | 1.87 | 1.79 | 1.97 |
| O₂ Gas to Conc. Jet (123) | .35 | .38 | .46 | .33 | .39 |
| Air or O₂ to Vaporizer (97) | 4.45 | 4.25 | 4.20 | 9.90 | 9.85 |
| Total Flow out of Vaporizer | 7.09 | 6.56 | 6.53 | 12.02 | 12.21 |
| Analysis, Wt. Percent: | | | | | |
| Approx. O₃ in Sept. Liq. | 46 | 70 | 62 | 76 | 88 |
| O₃ after Ozonator | 1.07 | 1.05 | 1.03 | 1.07 | 1.15 |
| O₃ in O₂ Recycle | .040 | .033 | .052 | .030 | .023 |
| O₃ in Gas from vaporizer | 1.56 | 1.94 | 1.64 | 1.03 | 1.14 |
| Ozone Balance #/hr.: | | | | | |
| Net Ozone produced | .527 | .541 | .535 | .545 | .608 |
| From vaporizer | .550 | .632 | .533 | .615 | .693 |
| Ozone in Separator, Liq., Wt., Percent | | 55 | 40 | 65 | 83 |

Table II

| Run No. | 33 | 35 | 36 | 38 | 39 |
|---|---|---|---|---|---|
| Pressures, p. s. i. g.: | | | | | |
| Oxygen Blower (43) In | 1.4 | 2.1 | 2.2 | 2.0 | 1.9 |
| Oxygen Blower (43) Out | 7.8 | 8.6 | 8.7 | 8.3 | 8.4 |
| Air Blower (93) Out | 4.1 | 4.5 | 4.8 | 4.0 | 3.8 |
| Temperatures, °F.: | | | | | |
| Warm Exchanger:— | | | | | |
| Cycle in (51) | 76 | 63 | 63 | 69 | 70 |
| Cycle out (41) | 63 | 47 | 47 | 53 | 57 |
| ΔT | 13 | 16 | 16 | 16 | 13 |
| Cycle out (53) | 120 | 130 | 138 | 130 | 115 |
| Cycle in (39) | 140 | 150 | 153 | 150 | 135 |
| ΔT | 20 | 20 | 20 | 20 | 20 |
| Separator Vap. (137) | −287.0 | −286.2 | −286.8 | −286.0 | −286.0 |
| Separator Liq. (64) | −292.0 | −290.6 | −291.2 | −290.0 | −287.0 |
| ΔT | 5.0 | 4.4 | 4.4 | 4.0 | 1.0 |

In summary, it is to be realized that the present invention provides for dropping concentrated ozone in water, vaporizing this ozone, and entraining it in a suitable gaseous carrier. Preferably, the ozone is concentrated in oxygen by liquefaction, evaporation, and separation. By varying the latter steps or the flow of carrier gas, it is possible to vary the eventual ozone concentration. It is preferred to recirculate the purified oxygen to the ozonator. The disadvantages of recirculating the residual oxygen of an ozone-oxygen stream used in chemical reactions are thus avoided.

It is to be understood that changes can be made in the above-described preferred embodiment without departing from the invention defined by the following claims. For example, oxygen can be mixed with argon, helium, or other inert gases, and passed through the ozonator and then liquefied and separated or the ozone-rich liquid can be dropped into carbon tetrachloride or other suitable non-reactive liquid having a compatible boiling point.

We claim:
1. The method of producing a continuous ozone-containing gas stream comprising delivering a stream of oxygen-containing gas through an ozonizer and converting at least a part of the oxygen to gaseous ozone to produce a relatively low concentration of gaseous ozone, passing said ozonized gas stream through a condensation zone, progressively producing a liquid ozone-rich fraction during passage of said stream through said condensation zone, continuously, completely separating said ozone-rich liquid fraction from said remaining gas stream as said stream is discharged from the condensation zone, vaporizing said liquid ozone-rich fraction by contacting said fraction with a non-reactive, compatible liquid and entraining the vapors thus formed, in controllable concentrations, in a carrier gas.

2. The method of producing a continuous ozone-containing gas stream according to claim 1 wherein said non-reactive compatible liquid is water.

3. The method of producing a continuous ozone-containing gas stream according to claim 1 wherein said carrier gas is an inert gas.

4. The method of producing a continuous ozone-containing gas stream according to claim 1 wherein said carrier gas is air.

5. The method of producing a continuous ozone-containing gas stream according to claim 1 wherein said stream of oxygen-containing gas delivered through the ozonizer is obtained by vaporization of a supply of liquid oxygen and said ozonized gas stream is cooled by heat exchange with said liquid oxygen in furnishing heat for the vaporization of said liquid oxygen.

6. The method of producing a continuous ozone-containing gas stream according to claim 1 wherein said remaining gas stream after separation from said ozone-rich liquid fraction is recycled through said ozonizer.

7. The method of producing a continuous gas stream containing a carrier gas and a controllable concentration of ozone which comprises delivering a stream of oxygen-containing gas through an ozonizer and converting at least a part of the oxygen to gaseous ozone to produce a relatively low concentration of gaseous ozone, passing said ozonized gas stream through a condensation zone, forming in said condensation zone an ozone-rich liquid fraction, separating and delivering said ozone-rich liquid fraction from said condensation zone directly, without contact thereof against any intermediate, solid vaporizing surface, to a body of a compatible, non-reactive liquid effective to vaporize said ozone-rich liquid fraction upon contact therewith, and mixing the vapor evolved by vaporization of said ozone-rich liquid fraction with a controllable supply of a carrier gas.

8. The method of producing a continuous gas stream containing a carrier gas and a controllable concentration of ozone according to claim 7 wherein liquid oxygen is introduced into said ozonized gas stream and passed co-currently therewith through said condensation zone to effect condensation of said ozone-rich liquid fraction.

9. The method of producing a continuous gas stream containing a carrier gas and a controllable concentration of ozone according to claim 7 wherein said separated ozone-rich liquid fraction from said condensation zone is allowed to drip, under the influence of gravity, into said body of liquid, and said liquid fraction being so delivered is surrounded by an annular flow of a shielding gas free of hydrocarbons.

10. The method of recovering gaseous ozone from an ozone-rich liquid without the hazard of detonation, comprising, confining said ozone-rich liquid by wall surfaces maintained at a temperature below the vaporization temperature of said ozone-rich liquid, vaporizing said ozone-rich liquid by contact with a body of water while maintaining said ozone-rich liquid free of contact with any solid vaporizing surface, and recovering the gaseous ozone so vaporized.

References Cited in the file of this patent

UNITED STATES PATENTS

| 2,405,553 | Allison | Aug. 13, 1946 |
| 2,700,648 | Thorp et al. | Jan. 25, 1955 |
| 2,704,274 | Allison | Mar. 15, 1955 |

OTHER REFERENCES

Mellor: Comprehensive Treatise on Inorganic and Theoretical Chemistry, vol. 1 (1922), page 894.